(12) United States Patent
Van Der Ploeg et al.

(10) Patent No.: US 9,546,784 B2
(45) Date of Patent: Jan. 17, 2017

(54) BURNER

(75) Inventors: Govert Gerardus Pieter Van Der Ploeg, Amsterdam (NL); Henricus Gijsbertus Van Schie, Amsterdam (NL); Johannes Gerardus Maria Schilder, Amsterdam (NL)

(73) Assignee: SHELL OIL COMPANY, Houston, TX (US)

( * ) Notice: Subject to any disclaimer, the term of this patent is extended or adjusted under 35 U.S.C. 154(b) by 0 days.

(21) Appl. No.: 12/672,187

(22) PCT Filed: Aug. 5, 2008

(86) PCT No.: PCT/EP2008/060280
§ 371 (c)(1),
(2), (4) Date: May 19, 2011

(87) PCT Pub. No.: WO2009/019272
PCT Pub. Date: Feb. 12, 2009

(65) Prior Publication Data
US 2011/0217661 A1 Sep. 8, 2011

Related U.S. Application Data

(60) Provisional application No. 60/954,330, filed on Aug. 7, 2007.

(30) Foreign Application Priority Data

Aug. 6, 2007 (EP) .................................... 07113849

(51) Int. Cl.
*F23D 11/00* (2006.01)
*B05B 15/00* (2006.01)
(Continued)

(52) U.S. Cl.
CPC .................. *F23D 1/00* (2013.01); *C10J 3/506* (2013.01); *C10J 2200/09* (2013.01);
(Continued)

(58) Field of Classification Search
USPC ............................... 431/160, 159; 239/132.3
See application file for complete search history.

(56) References Cited

U.S. PATENT DOCUMENTS 3,255,966 A * 6/1966 Hoffert et al. ............. 239/132.3
3,563,683 A * 2/1971 Hess .................... C03B 5/2356
239/132.3
(Continued)

FOREIGN PATENT DOCUMENTS

CN 2129878 4/1993 ............. F23D 14/42
CN 2506879 8/2002 ............. F23D 14/48
(Continued)

*Primary Examiner* — Steven B McAllister
*Assistant Examiner* — Desmond C Peyton

(57) ABSTRACT

The invention relates to a burner, particularly for the gasification of solid carbonaceous materials by partial combustion. The burner comprises a central channel (2) and at least one coaxial channel (6). The channels (2, 6) are defined by concentric walls (3, 5) having free downstream outer ends profiled to define an annular slit (10) forming a discharge end of the coaxial channel (6) and converging towards an adjacent discharge end of the central channel (2). The burner (1) is encased by a cooling jacket (14) and comprises a front face (21) with double walls spaced by one or more baffles (28) defining a coolant flow path operatively connected to the cooling jacket (14). The cooling jacket (14) has an upstream section (14A) and a transitional section (25) narrowing down to the front face (21) having a smaller outer diameter than the upstream cooling jacket section.

4 Claims, 2 Drawing Sheets

(51) Int. Cl.
*F23D 1/00* (2006.01)
*C10J 3/50* (2006.01)

(52) U.S. Cl.
CPC ..... *C10J 2200/152* (2013.01); *F23D 2214/00* (2013.01); *F23D 2900/00018* (2013.01)

(56) References Cited

U.S. PATENT DOCUMENTS

| | | | | |
|---|---|---|---|---|
| 3,697,058 | A | * | 10/1972 | Chaikin et al. ............ 239/132.3 |
| 4,216,908 | A | * | 8/1980 | Sakurai et al. ............ 239/132.3 |
| 4,322,033 | A | * | 3/1982 | Rymarchyk et al. ...... 239/132.3 |
| 4,421,476 | A | * | 12/1983 | Gulden et al. ................ 431/243 |
| 4,666,397 | A | * | 5/1987 | Wenning et al. ............. 431/160 |
| 4,858,538 | A | * | 8/1989 | Kuypers et al. ............. 110/264 |
| 4,865,542 | A | * | 9/1989 | Hasenack et al. ........... 431/160 |
| 4,887,962 | A | * | 12/1989 | Hasenack et al. ........... 110/263 |
| 5,615,833 | A | * | 4/1997 | Robillard et al. ......... 239/132.3 |
| 5,947,716 | A | * | 9/1999 | Bellamy et al. ............. 431/159 |
| 5,954,491 | A | * | 9/1999 | Helton et al. ................ 431/159 |
| 6,010,330 | A | * | 1/2000 | Helton et al. ................ 431/160 |
| 6,284,324 | B1 | * | 9/2001 | Whittaker ..................... 427/452 |
| 7,993,131 | B2 | * | 8/2011 | Douglas .................. C10J 3/485 110/235 |
| 2003/0056439 | A1 | | 3/2003 | Wilhelm et al. ............. 48/127.9 |
| 2003/0196576 | A1 | | 10/2003 | Whittaker et al. ............ 110/260 |
| 2004/0067461 | A1 | | 4/2004 | Ranke et al. ..................... 431/9 |
| 2009/0049747 | A1 | * | 2/2009 | Von Kossak-Glowczewski et al. ................ 48/77 |
| 2012/0100496 | A1 | * | 4/2012 | Boer et al. ................... 431/160 |

FOREIGN PATENT DOCUMENTS

| | | | |
|---|---|---|---|
| CN | 1916493 | 2/2007 | ................ C10J 3/20 |
| CN | 201228965 | 4/2009 | ................ F23D 1/00 |
| CN | 20123307 | 5/2009 | ............ F23D 1/100 |
| DE | 19729089 | 1/1999 | ............ F23D 11/40 |
| EP | 108427 | 5/1984 | ................ F23D 1/00 |
| EP | 0127273 A2 | 12/1984 | |
| EP | 0268432 | 5/1988 | ................ B05B 7/04 |
| EP | 328794 | 8/1989 | ................ C10J 3/48 |
| EP | 437698 | 7/1991 | ................ C10J 3/46 |
| EP | 0582521 A1 | 2/1994 | |
| EP | 652276 | 5/1995 | ................ C10J 3/48 |
| EP | 1577414 A2 | 9/2005 | |
| GB | 1027041 | 4/1966 | |
| GB | 1135411 | 12/1968 | ............ F23D 11/12 |
| GB | 1229802 | 4/1971 | ............ F23D 11/00 |
| GB | 2151348 | 7/1985 | ................ F23D 1/00 |
| JP | S59227977 A | 12/1984 | |
| JP | H02008603 A | 1/1990 | |
| JP | 02-133524 U | 11/1990 | |
| JP | H06201112 A | 7/1994 | |
| JP | 2004-510938 A | 4/2004 | |
| JP | 2005-281855 A | 10/2005 | |
| JP | 2006-274312 A | 10/2006 | |
| JP | 2007-516150 A | 6/2007 | |
| WO | 0181825 A1 | 11/2001 | |
| WO | 2005000749 A2 | 1/2005 | |
| WO | WO 2009019271 A1 * | 2/2009 | ................ F23D 1/00 |

\* cited by examiner

US 9,546,784 B2

BURNER

PRIORITY CLAIM

The present application claims priority to European Patent Application 07113849.9 filed 6 Aug. 2007 and U.S. Provisional Patent Application 60/954,330 filed 7 Aug. 2007.

FIELD OF THE INVENTION

The invention relates to a burner comprising a central channel and at least one coaxial channel surrounding it for the supply of separate flows of co-reactive gaseous or gas-carried media. The burner is particularly suitable for use in the partial combustion of carbonaceous fuels, such as finely divided solid fuel carried by a gas carrier, e.g., pulverized coal carried by a gas carrier such as nitrogen gas and/or carbon dioxide, using an oxygen-containing gas, e.g., for producing pressurized synthesis gas, fuel gas or reducing gas.

BACKGROUND OF THE INVENTION

Partial combustion, also known as gasification, of a solid carbonaceous fuel is obtained by the reaction of the fuel with oxygen. The fuel mainly contains carbon and hydrogen as combustible components. The gas-carried finely divided carbonaceous fuel and the oxygen-containing gas are passed via the separate channels in the burner into a reactor at relatively high velocity. In the reactor a flame is maintained in which the fuel reacts with the oxygen in the oxygen-containing gas at temperatures above 1300° C. to form mainly carbon monoxide and hydrogen.

The term "oxygen-containing gas" as used herein is intended to refer to gas containing free oxygen, $O_2$, and to include air, oxygen-enriched air, i.e., more than 21 mole % oxygen, and also substantially pure oxygen, i.e., more than about 95 mole % oxygen, with the remainder comprising gases normally found in air such as nitrogen, and/or rare gases.

The term "solid carbonaceous fuel" as used herein is intended to include various gas carried combustible materials and mixtures thereof from the group of coal, coke from coal, coal liquefaction residues, petroleum coke, soot, biomass, and particulate solids derived from oil shale, tar sands and pitch. The coal may be of any type, including lignite, sub-bituminous, bituminous and anthracite. The solid carbonaceous fuels are preferably ground to a particle size so that at least about 90% by weight of the material is less than 90 microns and moisture content is less than about five percent weight.

U.S. Pat. No. 4,887,962 discloses a burner for such a partial combustion process. The burner comprises a central channel with an outlet for supplying the fuel to the combustion zone, and a coaxial annular channel with an outlet surrounding the central channel outlet to supply an oxygen containing gas intersecting and mixing with the flow of solid fuel from the outlet of the central channel. The burner further comprises a front face disposed at the discharge end of the burner. The front face has a central aperture through which the fuel and the oxygen containing gas flow to the combustion zone. Approaching the outlet, the diameter of the annular channel supplying the oxygen containing gas decreases resulting in an angle with respect to the longitudinal axis. The thus obtained inclining annular slit should be stably dimensioned in order to obtain a constant and evenly distributed flow of oxygen-containing gas. Due to the inclination of the annular slit in the flow direction, the issuing gas flow will intersect and mix with the flow of co-reactive combustible material issuing from the central channel into the downstream combustion zone.

Since the combustion temperatures may reach 1300° C. or more, a primary concern of such burners is to prevent damage to the burner front, also referred to as the burner face, caused by the high heat flux during the gasification process. To protect the burner front from overheating, U.S. Pat. No. 4,887,962 proposes to use a hollow wall member with internal cooling passages through which fluid coolant is circulated at a rapid rate along a spiral flow path to assure even cooling of the burner front face so as to minimize thermal stresses which could cause deterioration and even failure of the burner during prolonged operation, particularly by fatigue stresses, which may ultimately result in leaks of coolant. In U.S. Pat. No. 4,887,962 a large number of spiral turns is required to cool the complete burner front, resulting in considerable pressure drop.

SUMMARY OF THE INVENTION

It is an object of the present invention to increase the effectiveness of the coolant flow, particularly where the thermal stresses are highest.

The object of the invention is achieved by providing a burner comprising a central channel and at least one coaxial channel surrounding the central channel, the channels leading from an upstream supply side to a downstream discharge end, the central channel and the coaxial channel being defined by concentric inner and outer walls having free downstream outer ends profiled to define an annular slit forming a discharge end of the coaxial channel and converging towards an adjacent discharge end of the central channel, the burner being encased by a cooling jacket and comprising a front face with double walls being spaced by one or more baffles defining a coolant flow path operatively connected to the cooling jacket which has a transitional section narrowing down to the smaller outer diameter of the front face. The transitional section can for example wholly or partly be tapered, semi-spherical or stepped or can have any other suitable shape narrowing down in flow direction to a smaller diameter. As a result, the cooling effect is focussed on the tip of the channels where the fuel and oxygen flows intersect and mix and where the thermal stresses are highest. The pressure drop in the flow path within the front face is effectively reduced.

The transitional section of the cooling jacket can be directly connected to its upstream part. Alternatively, the transitional section of the cooling jacket with the downstream burner parts surrounded by it and the upstream part of the cooling jacket with the burner parts surrounded by it are mounted on opposite sides of a connection block having openings to allow flow-through from the upstream part of the channels and coolant flow paths to their downstream parts. The advantage of such a connection block is that a more stable and constant outflow of gas through the annular slit results.

Optionally, the cooling jacket comprises at least one compartment with baffles defining a spiral flow path. A spiral flow path can for example be realized in a cost effective way with at least three parallel baffles defining parallel channel sections which are concentric with the burners central channel, each baffle being provided with an interruption between two facing baffle ends, with parallel partitions each linking a baffle end to a facing baffle end of an adjacent baffle. This way, the partitions lead the coolant flow from one channel section to a next one. To hydraulically optimize the coolant flow, the channel sections can, e.g., be dimensioned such that the cross-sectional area of a channel section is smaller than the cross-sectional area of the channel section next in coolant flow direction.

The present burner is well suited to introduce the reactants in any desired manner, i.e., vertically, horizontally or under an angle, into the reaction zone of a partial oxidation gas generator, and is particularly suited for use in solid fuel gasification apparatus having a plurality of burners for the reactants positioned on substantially opposite sides of the combustion zone, whereby the reactants are introduced horizontally and the burner jets impinge on each other to facilitate the partial oxidation process and to minimize erosion of the refractory wall.

The burner will ordinarily be fabricated of high temperature resistant materials, particularly high temperature resistant metals and alloys such as sold under the trademark Inconel® and be fabricated, e.g., by welding, brazing or the like. For high duty operations the channels and outlets for oxygen-containing gas, which are usually made of metal, may be internally coated with an oxidic coating, such as $ZrO_2$, or a ceramic, enabling the application of high flow velocities of the oxygen-containing gas without the risk of metal combustion by the oxygen.

BRIEF DESCRIPTION OF THE DRAWINGS

The invention will now be described in more detail, by way of example only, with reference to the accompanying drawings, wherein.

DETAILED DESCRIPTION OF THE INVENTION

Figure 1:
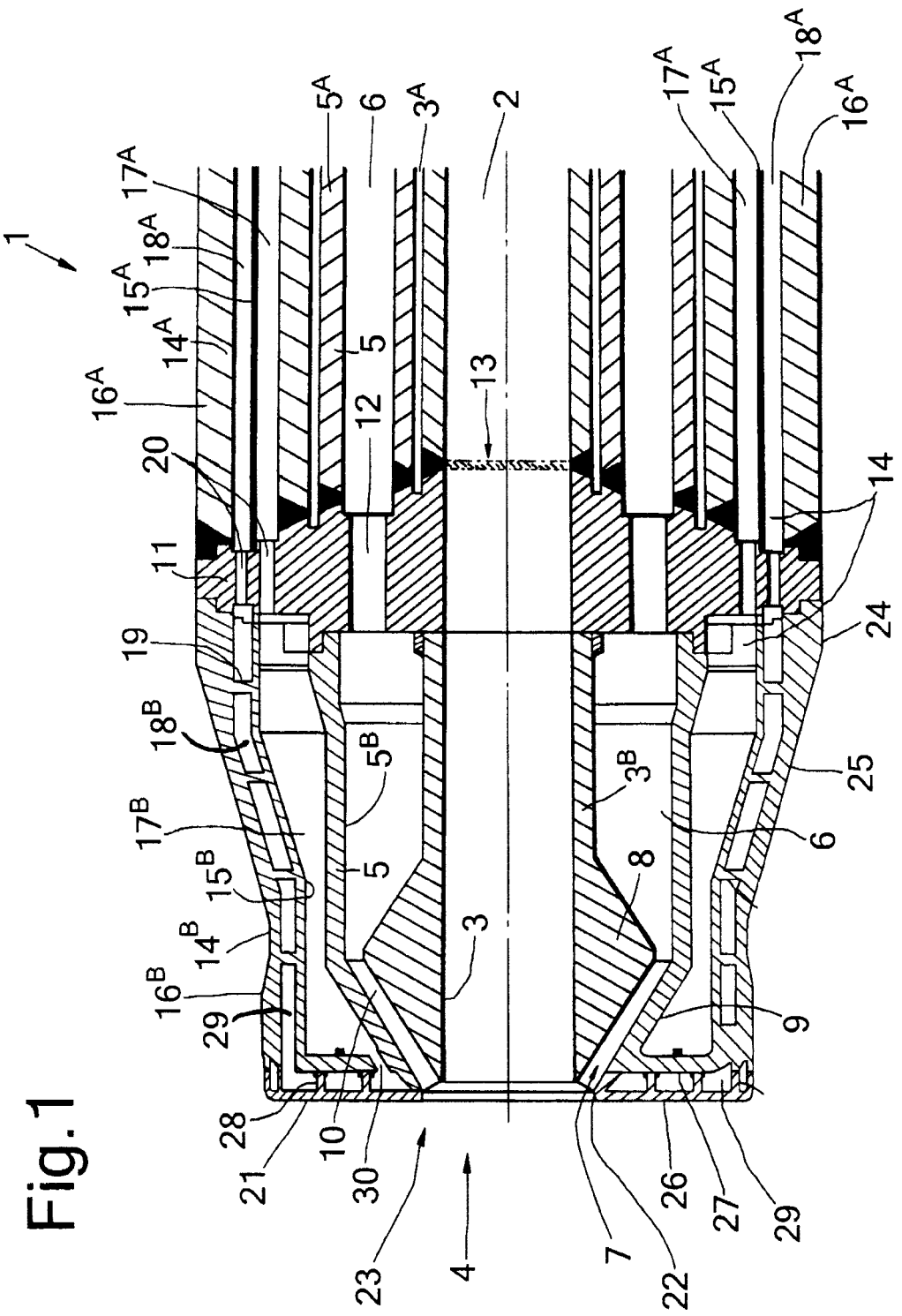
FIG. 1 shows a longitudinal cross section of a burner according to the invention.

FIG. 1 shows a burner 1 for the partial combustion of a carbonaceous fuel, such as pulverized coal carried on for example nitrogen or carbon dioxide gas. The burner 1 comprises a central channel 2 defined by a cylindrical inner wall 3 disposed along a longitudinal axis and having a discharge outlet 4 for supplying the gas carried fuel to a combustion zone. Concentrically arranged around the inner wall 3 is a cylindrical outer wall 5. The inner and outer wall 3, 5 define an annular coaxial channel 6 for supplying an oxygen containing gas. The inner wall 3 has a double walled upstream part 3A and a single walled downstream part 3B. Similarly, the outer wall 5 has a double walled upstream part 5A and a single walled downstream part 5B. The coaxial channel 6 has an open discharge end 7 forming an outlet for the oxygen-containing gas flow into the combustion zone.

The inner wall 3 has a constant inner diameter and a conically expanded part 8 with enlarged outer diameter declining towards the discharge outlet 4 so as to form an annular bulge with—in this particular embodiment—a triangular cross section. The downstream part of outer wall 5B forms a cylinder with a conical end 9 convergent in flow direction. The part 8 of the downstream inner wall part 3B and the conical end 9 of the downstream outer wall part 5B define an annular slit 10 of even width and wherein part 8 has a diameter decreasing in the direction of the discharge outlet 4. This annular slit 10 forms the discharge outlet 7 of the coaxial channel 6.

The inner and outer wall parts 3A, 3B, 5A, 5B are welded to a connection block 11. The block is provided with apertures 12 in line with the coaxial channel 6, and a central opening 13 in line with the central channel 2 and wherein opening 13 has the same diameter as central channel 2.

The coaxial channel 6 is encased by a cooling jacket 14A at the upstream side of the connection block 11 and a downstream part 14B at the downstream part of the connection block 11. Two coaxial casings 15A, 16A are welded to the upstream side of connection block 11 to form two concentric compartments 17A, 18A of the upstream cooling jacket section 14A.

The downstream part of the cooling jacket 14B comprises an inner jacket wall 15B, forming the upstream extension of upstream inner casing 15A, and an outer jacket wall 16B, forming the downstream extension of casing 16A. The space 18B between the jacket walls 15B and 16B forms the downstream extension of the upstream cooling jacket compartment 18A and is divided by baffles 19 into spiral channels. The space 17B between inner jacket wall 15B and the outer wall part 5B forms the downstream extension of upstream cooling jacket compartment 17A. The connection block 11 is provided with two concentric circular arrays of openings 20 connecting the upstream cooling jacket compartments 17A, 18A with the downstream cooling jacket compartments 17B, 18B respectively.

Downstream the cooling jacket section 14B, a double walled front face 21 is disposed under right angles with the cooling jacket walls 15B, 16B. The front face 21 has an inner edge 22 defining a central opening 23 and adjoining the outer edge of the coaxial channels outer wall 5B.

The front face 21 has an outer diameter which is smaller than the outer diameter of the upstream cooling jacket part 14A. In flow direction the down stream cooling jacket part 14B has a first section 24 with the same outer diameter as upstream cooling jacket casing 14A, and a partly tapered transitional second section 25 narrowing down to the outer diameter of the front face 21.

The double walled front face 21 has a downstream front wall 26 and a back side wall 27 spaced by baffles 28 defining a spiral flow path 29 in open connection with downstream cooling jacket compartment 18B. Near the opening 23 in the front face 21, the flow path 29 between the front and back side wall 26, 27 of the front face 21 is in open connection with the downstream cooling jacket compartment 17B via an opening 30 in the front face back side wall 27.

The upstream inner cooling jacket compartment 17A is connected to a supply of a liquid coolant. The coolant flows from the inner cooling jacket compartment 17A, via openings 20 in block 11, downstream compartment 17B, opening 30, flow path 29 in front face 21, outer cooling jacket compartment 18B, openings 20 in block 11, and outer compartment 18A to a coolant discharge.

The burner 1 of FIG. 1 is essentially cylindrical. The block 11 is a circular block with a diameter corresponding to the outer diameter of the cooling jacket. The openings 12 and 20 form a circular arrays concentric with the central opening 13.

Figure 2:
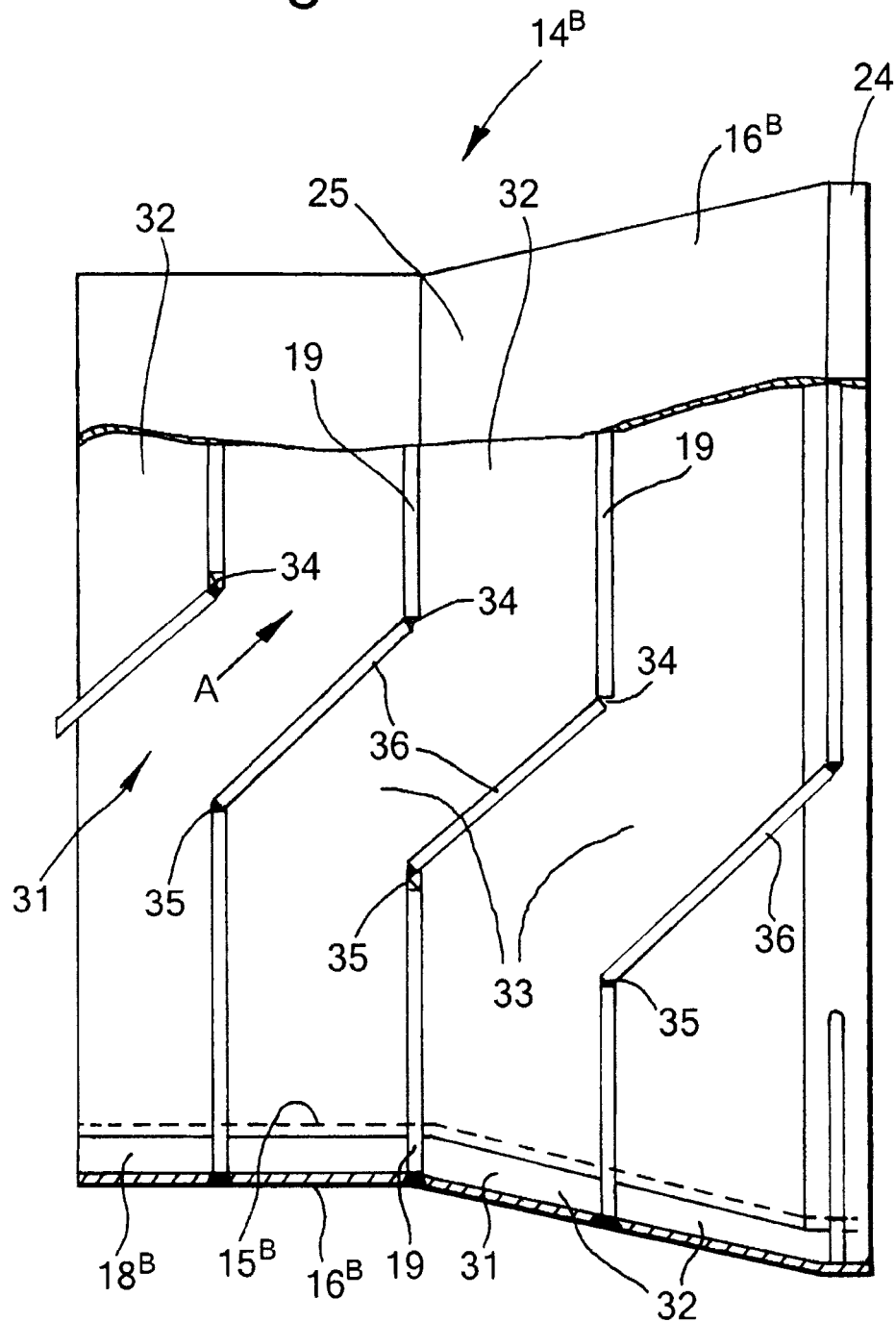
FIG. 2 shows a side view of a downstream cooling jacket part of the burner of FIG. 1 with the outer wall partly broken away.

FIG. 2 shows the downstream cooling jacket part 14B with its outer wall 16B partly broken away to show the spiral flow path 31 in the downstream cooling jacket compartment 18B between the inner wall 15B and the outer wall 16B. It is noted that the resulting flow direction of the coolant in the spiral flow path 31 is opposite to the flow direction of the reactant gaseous media in the burner channels. In the cooling jacket compartment 18B, the coolant flows from the small diameter section attached to the front face 21 to the direction of the larger diameter section 24. In FIG. 2, the coolant flow direction is indicated by arrow A. The baffles 19 are disposed parallel with each other and normal to the walls 15B, 16B, defining parallel channel sections 32. The baffles 19 are interrupted by openings 33 between an upper baffle end 34 and a lower baffle end 35. Each lower baffle end 35 is linked by a partition 36 to the upper baffle end 35 of the baffle 19 positioned next in the coolant flow direction A, which is the closest facing baffle end of the two adjacent baffles 19. This way, the openings 33 lead a passing coolant flow from one channel section 32 to the channel section 32 next in coolant flow direction. Each channel section 32 is wider than the channel section preceding it in coolant flow direction, resulting in stepwise increasing cross-sectional area of the flow path in coolant flow direction. The shortest distance between two adjacent openings 33 should not be less than the width of the preceding channel section 32 and should not be more than the width of the channel section 32 next in coolant flow direction A. To this end, the upper baffle edges 34—and the lower baffle edges 35 respectively—are not in line in axial direction but each upper baffle edge 34 protrudes in tangential direction relative to the upper baffle edge 34 preceding in coolant flow direction. Similarly, each lower baffle edge 35 protrudes in tangential direction relative to the upper baffle edge 35 next in coolant flow direction. The openings 33 have a slightly arched shape following the cylindrical shape of the inner and outer wall parts 15B, 16B.

During operation of the above described burner for the gasification of carbonaceous fuel, e.g., pulverized coal by means of oxygen-containing gas, said coal suspended in a carrier fluid, such as, e.g., nitrogen or carbon dioxide, is passed through the central channel to outlet for introducing the coal into the combustion zone of a reactor arranged downstream of the burner. Simultaneously, oxygen-containing gas is passed through the coaxial channel to its outlet so that the coal and oxygen-containing gas reactants will be intensively mixed in the reactor space. The mixing of the reactants can be further promoted by a swirling motion imparted to one or both streams by a swirl body of baffles in the appropriate channel.

What is claimed is:

1. A burner comprising a central channel and at least one coaxial channel surrounding the central channel, the channels leading from an upstream supply side to a downstream discharge end, the central channel and the coaxial channel being defined by concentric inner and outer walls having free downstream outer ends profiled to define an annular slit forming a discharge end of the coaxial channel and converging towards an adjacent discharge end of the central channel, the burner being encased by a cooling jacket and comprising a double walled front face having an outer diameter, the double walls of the front face being spaced by one or more baffles defining a coolant flow path operatively connected to the cooling jacket wherein the cooling jacket has an upstream section having an outer diameter and transitional section having an outer diameter narrowing down from the outer diameter of the upstream section to the outer diameter of the front face, the outer diameter of the front face being smaller than the outer diameter of the upstream section of the cooling jacket;

wherein the transitional section of the cooling jacket and the upstream part of the cooling jacket are attached to opposite sides of an interposed connection block having openings to allow flow-through through the channels and the coolant flow paths;

wherein the coolant flow path upstream of the connection block comprises a non-spiral flow path; and wherein the transitional section comprises a non-spiral flow path upstream of the front face and a plurality of baffles defining a spiral flow path downstream of the front face, operatively connected to the coolant flow path defined by the baffles of the front face.

2. A burner according to claim 1, wherein the outer diameter of the transitional section is at least partly tapered.

3. A burner according to claim 1, wherein the cooling jacket comprises at least one compartment with at least three parallel baffles defining channel sections concentric with the burners central channel, each baffle being provided with an opening between two facing baffle ends, with parallel partitions each linking a baffle end to a facing baffle end of an adjacent baffle.

4. A burner according to claim 3, wherein the cross-sectional area of a channel section is smaller than the cross-sectional area of a channel section next in coolant flow direction.

\* \* \* \* \*